March 22, 1966 E. J. KLASSEN Re. 25,985

STACK CHAIR

Original Filed Oct. 4, 1961 2 Sheets-Sheet 1

INVENTOR.
EDWARD J. KLASSEN
BY Lilly & Nyhagen
Attorneys

March 22, 1966 E. J. KLASSEN Re. 25,985

STACK CHAIR

Original Filed Oct. 4, 1961 2 Sheets-Sheet 2

INVENTOR.
EDWARD J. KLASSEN
BY Lilly & Nyhagen
Attorneys

United States Patent Office

Re. 25,985
Reissued Mar. 22, 1966

25,985
STACK CHAIR

Edward J. Klassen, 11461 Sunset Blvd.,
Los Angeles 49, Calif.

Original No. 3,095,236, dated June 25, 1963, Ser. No. 142,872, Oct. 4, 1961. Application for reissue Nov. 29, 1963, Ser. No. 337,116
9 Claims. (Cl. 297—239)

Matter enclosed in heavy brackets [ ] appears in the original patent but forms no part of this reissue specification; matter printed in italics indicates the additions made by reissue.

This invention deals generally with articles of furniture and, more particularly, with an improved stack chair.

Chairs of the type which are used to furnish temporary seating for auditoriums and other public meeting places, as well as chairs for home or office use, are frequently designed for compact storage when not in use. For example, some chairs of this type are constructed so that they may be folded to a compact condition while other chairs, commonly referred to as stack chairs, are arranged so that they can be stacked in an unfolded condition one on top of the other.

A general object of this invention is to provide an improved stack chair.

A more specific object of the invention is to provide a stack chair which is so constructed that when several of the chairs are stacked one on top of the other, the center of gravity of the stack remains over the area bounded by the legs of the lower chair in the stack so as to assure a stable stack.

Yet another object of the invention is to provide a stack chair of the character described equipped with integral stacking [brackets] *shoulders* by which each chair in a stack of the present chairs is supported on the adjacent lower chair in the stack.

A further object of the invention is to provide a stack chair of the character described which is upholstered and arranged so that each chair in a stack of the present chairs is held out of contact with the seat and back cushions of the adjacent lower chair whereby compression of the cushions of the lower chairs in the stack by the weight of the upper chairs is avoided.

[A further object of the invention is to provide a stack chair of the character described which is equipped with arm rests.]

[Yet a further object of the invention is to provide a stack chair of the character described having a unique detachable writing desk.]

A [still] further object of the invention is to provide a stack chair of the character described which is relatively simple, inexpensive to manufacture, and otherwise ideally suited to its intended purposes.

Other objects, advantages, and features of the invention will become readily apparent as the description proceeds.

The invention will now be described in detail by reference to the attached drawings, wherein.

Figure 1:
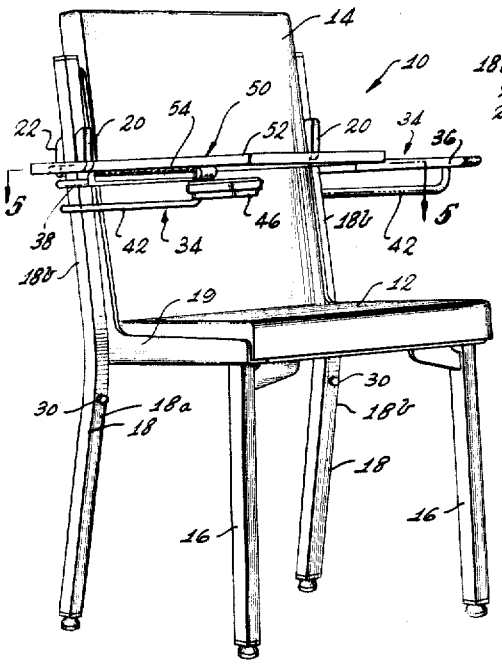
FIG. 1 is a perspective view of [the present] *a presently preferred* stack chair *according to the invention*.

Chair 10 of this invention comprises a rectangular seat 12, a back rest 14 along the rear edge of the seat, front legs 16 adjacent the front edge of the seat, and a pair of rear [legs 18 at the rear of the seat] *upright members 18 which extend below the seat to form rear chair legs 18a*. These several parts of the chair are rigidly joined to form a rigid chair structure by means including generally L-shaped metal side frame members 19.

Figure 3:
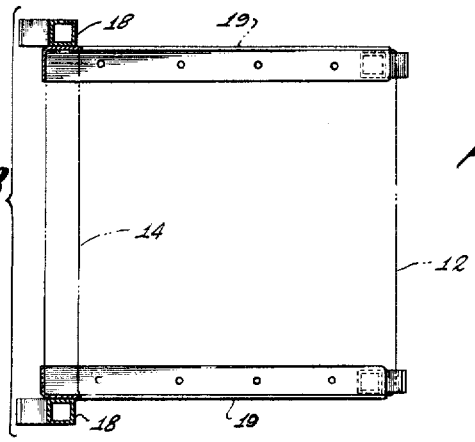
FIG. 3 is a section taken along line 3—3 of FIG. 2.
Figure 5:
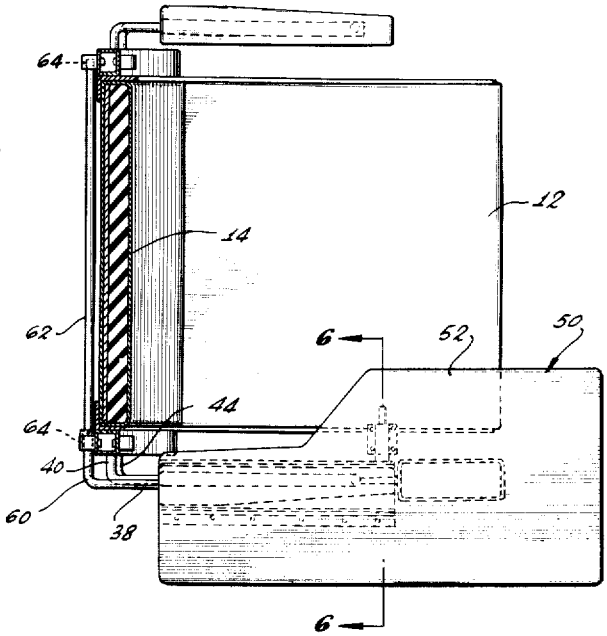
FIG. 5 is a section taken along line 5—5 of FIG. 1.

The rear [legs] *members 18* of the chair are located [beyond] *laterally outboard of* the side edges of the chair seat 12, as may be best observed in FIGS. 1, 3 and 5 [, and include lower end 18a which extend below the seat and]. *The* upper ends 18b [which] *of the members 18* extend above the seat along the side edges of [and coplanarly with] the back rest 14. [The lower ends 18a of the rear legs as well as the upper ends of these legs and the back rest 14 are rearwardly inclined with respect to a plane passing through the rear edge of the seat normal to the latter so that the included angle between these parts, measured at the rear side of the chair, is less than 180°.]

Mounted on the front sides of the upper ends 18b of the rear [chair legs, which actually form part of the back rest of the chair,] *members 18* are a pair of *front* brackets 20. Mounted on the rear sides of the upper ends [18b of the rear legs] *of these members* are a pair of identical but inverted *rear* brackets 22. As will shortly be seen, these brackets are used when stacking several of the present chairs and, for this reason, are referred to herein as stacking brackets. The pair of front and rear stacking brackets 20, 22 at each side of the back rest are located approximately in a common plane [parallel to the sides] *normal to the seat 12 and back 14* of the chair. The adjacent front and rear brackets are joined by a headed fastener 24 which extends through the brackets and upper end 18b of the adjacent rear [leg] *frame member* 18, as shown in FIG. 4.

The front stacking brackets 20 define coplanar, upwardly facing [shoulder surfaces] *stacking shoulders* 26. The rear stacking brackets 22 define coplanar, downwardly facing [shoulder surfaces] *stacking shoulders* 28. As may be observed best in FIG. 4, these [shoulder surfaces *shoulders* are disposed at an acute angle to the [back rest of the chair] *rear members 18. It will be observed that the front, upper stacking shoulders 26 are accessible from the front sides of the chair back 14 and the members 18 for engagement from above, and the rear, lower stacking shoulders 28 are accessible from the rear sides of the chair back and members 18 for engagement from below.*

Figure 2:
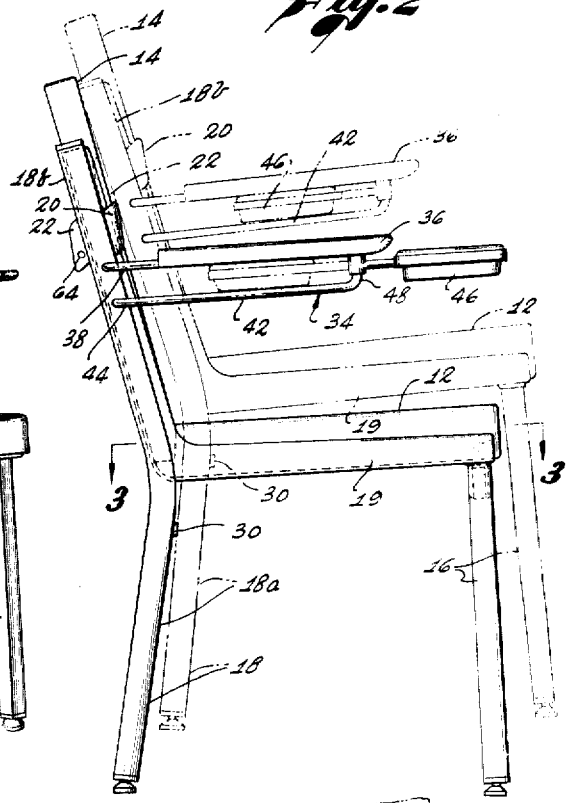
FIG. 2 illustrates two of the [present] chairs stacked one on top of the other.
Figure 4:
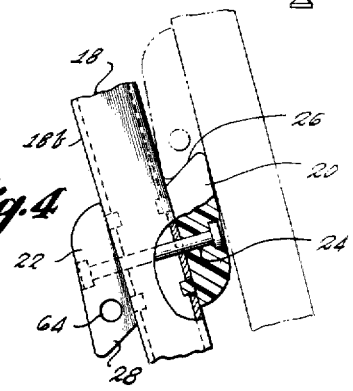
FIG. 4 is a detail, partially broken away, of [the] *certain* stacking brackets [on] *embodied in* the [present] stack chair *of FIG.* 1.

When stacking the present chairs, [one chair is] *the latter are* placed *one* on top of another with the rear legs [18] *18a* of [the upper] *each* chair straddling the seat 12 of the *adjacent* lower chair *forwardly of the rear legs of the lower chair* and *with* the rear stacking [brackets 22] *shoulders 28* on [the upper] *each* chair resting on the front stacking [brackets 20] *shoulders 26* on the *adjacent* lower chair, [with the shoulder surfaces 26 and 28 of the brackets in contact,] as shown in FIGS. 2 and 4. [The upper] *Each* chair *in the stack* is thereby supported on the stacking brackets of the *adjacent* lower chair. The acute [angular disposition] *angle* of the [shoulder surfaces of the brackets with respect to the back rest] *stacking shoulders* affords the [brackets] *latter* with [a hook-like] *an interlocking* action that securely [locks the upper chair against tipping forward] *restrains the shoulders against accidentatl disengagement.*

The rear legs [18] *18a* of [the upper] *each* chair rest against the rear legs of the *adjacent* lower chair, as shown in FIG. 2. Preferably, the rear chair legs mount *projecting spacers or* bumpers 30 at their forward sides against which the ear legs of the *adjacent* upper chair engage to prevent marring or scratching of the rear chair legs during stacking. *These spacers also serve to angularly position each chair relative to its adjacent lower chair, as will be explained.*

As may be observed best in FIG. 2, the [upwardly facing shoulder surfaces 26 on the front stacking brackets 20] *upper stacking shoulders 26* are [spaced] *located* above [the downwardly facing shoulder surfaces 28 on the lower stacking brackets 22 a distance which] *and forwardly of the lower stacking shoulders 28. The vertical spacing between the upper and lower shoulders* is slightly greater than the thickness of the chair seat so that when one chair is stacked on top of another, in the manner shown [in FIG. 2], the seat 12 of the upper chair is spaced from the seat of the lower chair. Also, [the stacking brackets space] the back [rest] of the upper chair *is spaced* from the back [rest] of the [adjacent] lower chair, as shown. Crushing of upholstry or cushions on the [seats] *seat* and back [rests] of the lower [chairs] *chair* by the weight of the upper [chairs] *chair* is thereby avoided. *The same obviously applies to the several chairs in the chair stack of FIG. 7.*

It will be observed that when [two of] the present chairs are stacked [in the manner shown in FIG. 2], the rear legs *18a* [and back rest] of [the upper] *each* chair are displaced upwardly with respect to the rear legs [and back rest] of the *adjacent* lower chair. [As a consequence, the points of contact of the rear legs of the lower chair on the rear legs of the upper chair (i.e., at the bumpers 30 on the rear legs of the lower chair) are offset downwardly along the rear legs of the upper chair with respect to the points at which the rear legs of the lower chair would contact the rear legs of the upper chair if they were at the same elevation. Because of the rearward bend or inclination of the rear legs and back rests of the chairs, this displacement of the first-mentioned points of contact along the rear legs of the upper chair places those points further to the rear on the upper chair than the second-mentioned points of contact with the result that the upper chair] *Owing to the illustrated rearward bend of the rear legs relative to the chair back, therefore, each chair in the stack* is tipped upwardly at a slight angle with respect to the *adjacent* lower chair, as may be readily observed in FIG. 2.

Figure 7:
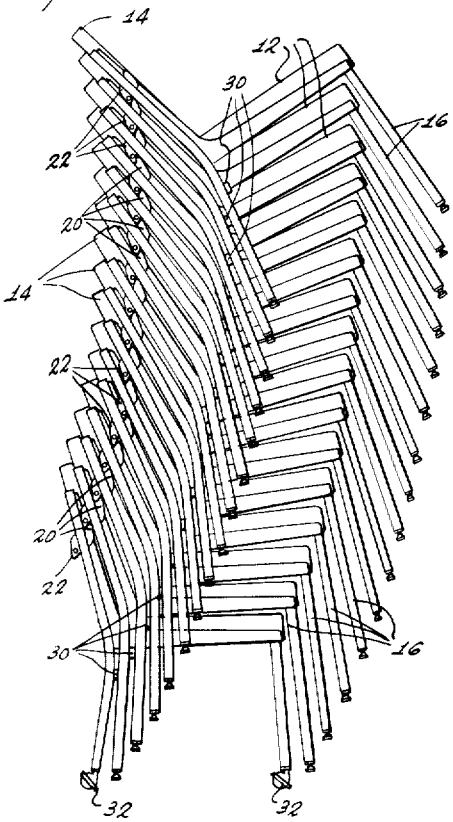
FIG. 7 illustrates several chairs of the present invention stacked one on top of the other, the arm rests on the chairs being eliminated for the sake of clarity.

[When several chairs are stacked one on top of the other, of course, each chair in the stack is tipped upwardly slightly with respect to the next lower chair so that the] *Accordingly, the chair* stack curves forwardly and then back over the lowermost chair, in the manner illustrated in FIG. 7. [As a consequence, the] *The* center of gravity of the stack *thus* remains over the area bounded by the legs of the lowermost chair so that the stack is stable and will not tip under its own weight.

It is obvious that the angle through which each chair is tipped with respect to the next lower chair depends on various factors, such as the angle between the back rest and rear chair legs, the length of the [bumpers] *spacers* 30, etc. and, therefore, may be changed by changing these factors to accommodate stacking of different numbers of chairs. For example, the illustrated chair is adapted best for a sixteen chair stack. If a lesser number of chairs are to be stacked, the chair is preferably designed so the angle of tip of each chair with respect to the next lower chair is slightly greater than that shown so that the upper chairs in the stack will be located more directly over the lower chair. Similarly, if a greater number of chairs are to be stacked, the chair is designed for a lesser angle of tip.

It is obvious that this upward tip of one chair in a stack of chairs with respect to the next lower chair, so as to maintain the center of gravity of the stack over the lowermost chair, can be achieved in other ways than by inclining the back rest and rear legs of the chair, as shown. For example, the back rest of the chair and rear legs could be substantially coplanar and each chair in a stack of chairs could be held at the required angle with respect to the next lower chair by suitable elongated [bumpers] *spacers* on the rear chair legs, or [bumpers] *spacers* on the sides of the seat ahead of the rear chair legs.

If desired, the lowermost chair in the stack can be provided with ball-type swivel casters 32 to permit the stack to be easily moved from one place to another. Ball-type swivel casters are preferable because of the inclination of the legs on the chair which would cause conventional casters to swivel improperly.

The chair may also be provided with side arms 34. These side arms comprise arm rests 36 attached to metal rods 38 having rear, right-angled ends which extend into and are fixed to the back rest 14 of the chair. The side arms further comprise lower reinforcing rods 42 which support the forward ends of the arm rests 36 and have rear, right-angled ends 44 extending into and fixed to the back rest 14. An ash tray 46 may be hinged to the forward, vertical end 48 of one rod 42 for swinging between its solid line extended position of use, shown in FIG. 2, and its phantom line retracted position of that figure. To permit the chairs to be stacked, of course, the rear ends of the side arm rods 38 and 42 must be located [beyond the sides] *laterally outboard* of the rear [chair legs] *members* 18, as shown in FIG. 5, so that the rear legs of one chair may straddle the seat of another chair in the manner described earlier.

Figure 6:
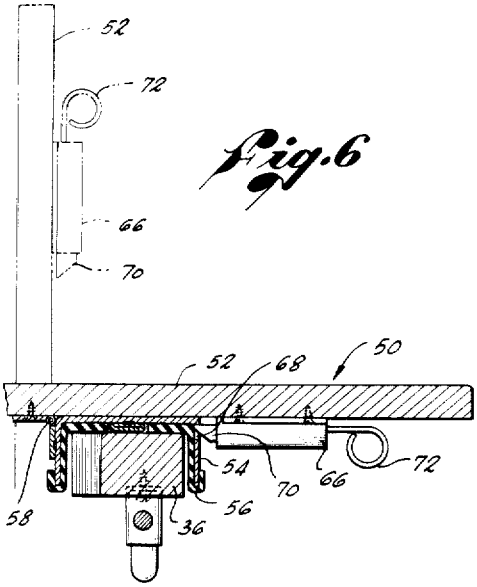
FIG. 6 is an enlarged section taken along line 6—6 of FIG. 5.

The invention also provides a detachable writing desk 50 for the chair. This desk comprises a [flat] top [member] 52 below which is a downwardly opening channel 54 (FIG. 6) that fits over one arm rest 36 of the chair. The channel is lined with a suitable material 56, such as a plastic material, to avoid marring of the arm rest. The top 52 is hinged to the channel 54, for pivoting between its full line position of use and its phantom line retracted position of FIG. 6, by hinge means 58.

Rigidly fixed to and extending rearwardly from the channel 54 is a metal rod 60 having a long, right-angled rear end portion 62 which is rotatably and removably received in coaxial bores 64 in the rear stacking brackets 22.

The desk 50 is easily removed from the chair, to permit stacking of the latter, by simply swinging it upwardly to disengage the channel 54 from the arm rest 36 and then axially withdrawing the rear end 62 of the desk rod 60 from the rear stacking brackets. The desk may be replaced, of course, by reversing this procedure.

A spring-biased latch 66 is mounted on the underside of the desk top 52 for locking engagement in a slot 68 in the side of channel 54 to retain the top in its full line position of use. The movable latch member 70 has a ring 72 by which it may be pulled to release the latch to permit the top to be hinged to its retracted position.

Clearly, therefore, the invention herein described and illustrated is fully capable of attaining the several objects and advantages preliminarily set forth.

Numerous modifications of the invention are, of course, possible within the spirit and scope of the following claims.

What is claimed is:

1. A stack chair comprising a rigid chair structure including a seat, a back rest, front legs and rear legs, said rear legs being disposed beyond the side edges of said seat, a pair of front stacking brackets mounted on the front side of said back rest adjacent the side edges thereof and defining upwardly facing [shoulder surfaces] *stacking shoulders,* a pair of rear stacking brackets mounted on the rear side of said back rest adjacent the side edges thereof and defining downwardly facing [shoulder surfaces] *stacking shoulders,* said front brackets projecting beyond the front side of said back rest and said rear brackets projecting beyond the rear side of said back rest, the front and rear brackets at each side of the chair being located approximately in a common plane parallel to the sides of the chair and said [shoulder surfaces] *shoulders* of the front brackets being spaced above said [shoulder surfaces] *shoulders* of the rear brackets a distance which is greater than the thickness of said seat, whereby one chair may be stacked on top of another with the rear legs of the upper chair straddling the seat of the lower chair and the downwardly facing [shoulder surfaces] *shoulders* of the rear stacking brackets on the upper chair resting on the upwardly facing [shoulder surfaces] *shoulders* of the front stacking brackets on the lower chair to support the upper chair on the lower chair with the back rest and seat of the upper chair retained out of pressured contact with the back rest and seat, respectively, of the lower chair.

2. A stack chair comprising a rigid chair structure including a seat, a back rest, front legs and rear legs, said rear legs being disposed beyond the side edges of said seat, [bumpers] *spacers* mounted at the sides of the chair forwardly of said rear legs, a pair of front stacking brackets mounted on the front side of said back rest adjacent the side edges thereof and defining upwardly facing [shoulder surfaces] *stacking shoulders,* a pair of rear stacking brackets mounted on the rear side of said back rest adjacent the side edges thereof and defining downwardly facing [shoulder surfaces] *stacking shoulders,* said front brackets projecting beyond the front side of said back rest and said rear brackets projecting beyond the rear side of said back rest, the front and rear brackets at each side of the chair being located approximately in a common plane parallel to the sides of the chair and said [shoulder surfaces] *shoulders* of the front brackets being spaced above said [shoulder surfaces] *shoulder* of the rear brackets a distance which is slightly greater than the thickness of said seat, whereby one chair may be stacked on top of another with the rear legs of the upper chair straddling the seat of the lower chair and resting against said [bumpers] *spacers* on the lower chair and the downwardly facing [shoulder surfaces] *shoulders* of the rear stacking brackets on the upper chair resting on the upwardly facing [shoulder surfaces] *shoulders* of the front stacking brackets on the lower chair to support the upper chair on the lower chair with the back rest and seat of the upper chair spaced from the back rest and seat, respectively, of the lower chair.

3. A stack chair comprising a rigid chair structure including a seat, a back rest, front legs and rear legs, said rear legs being disposed beyond the side edges of said seat and being rearwardly inclined at a small angle to the plane of the back rest, a pair of front stacking brackets mounted on the front side of said back rest adjacent the side edges thereof and defining upwardly facing [shoulder surfaces] *stacking shoulders,* a pair of rear stacking brackets mounted on the rear side of said back rest adjacent the side edges thereof and defining ownwardly facing [shoulder surfaces] *stacking shoulders,* said front brackets projecting beyond the front side of said back rest and said rear brackets projecting beyond the rear side of said back rest, the front and rear brackets at each side of the chair being located approximately in a common plane parallel to the sides of the chair and said [shoulder surfaces] *shoulders* of the front brackets being spaced above said [shoulder surfaces] *shoulders* of the rear brackets a distance which is slightly greater than the thickness of said seat, whereby one chair may be stacked on top of another with the downwardly facing [shoulder surfaces] *shoulders* of the rear stacking brackets on the upper chair resting on the upwardly facing [shoulder surfaces] *shoulders* of the front stacking brackets on the lower chair to support the upper chair on the lower chair with the back rest and seat of the upper chair spaced from the back rest and seat, respectively, of the lower chair and the rear legs of the upper chair resting against the rear legs of the lower chair to incline the seat of the upper chair upwardly at a slight angle with respect to the seat of the lower chair.

4. A stack chair comprising a rigid chair structure including a seat, a back rest, front legs and rear legs, said rear legs being disposed beyond the side edges of said seat, a pair of front stacking brackets mounted on the front side of said back rest adjacent the side edges thereof and defining upwardly facing [shoulder surfaces] *stacking shoulders* inclined at acute angles to the back rest, a pair of rear stacking brackets mounted on the rear side of said back rest adjacent the side edges thereof and defining downwardly facing [shoulder surfaces] *stacking shoulders* inclined at acute angles to the back rest, said front brackets projecting beyond the front side of said back rest and said rear brackets projecting beyond the rear side of said back rest, the front and rear brackets at each side of the chair being located approximately in a common plane parallel to the sides of the chair and said [shoulder surfaces] *shoulders* of the front brackets being spaced above said [shoulder surfaces] *shoulders* of the rear brackets a distance which is slightly greater than the thickness of said seat, whereby one chair may be stacked on top of another with the rear legs of the upper chair straddling the seat of the lower chair and the downwardly facing [shoulder surfaces] *shoulders* of the rear stacking brackets on the upper chair resting on the upwardly facing [shoulder surfaces] *shoulders* of the front stacking brackets on the lower chair to support the upper chair on the lower chair with the back rest and seat of the upper chair spaced from the back rest and seat, respectively, of the lower chair.

5. A stack chair comprising a rigid chair structure including a seat, a back rest, rear legs and front legs, said back rest and rear legs being rearwardly inclined with respect to a plane normal to and parallel to the rear edge of the seat whereby the included angle between the back rest and legs at the rear of the chair is less than 180°, [bumpers] *spacers* on the front side of said rear legs adjacent said seat, said rear legs being located beyond the side edges of said seat and including upper ends which extend along the side edges of said back rest in the plane of the latter, a pair of front stacking brackets mounted on the front sides of said upper ends of the legs and defining coplanar, upwardly facing [shoulder surfaces] *stacking shoulders* inclined at an acute angle to the back rest, a pair of rear stacking brackets mounted on the rear sides of said upper ends of the legs and defining coplanar, downwardly facing [shoulder surfaces] *stacking shoulders* inclined at an acute angle to the back rest, said upwardly facing [shoulder surfaces] *shoulders* of the front brackets being spaced above said downwardly facing [shoulder surfaces] *shoulders* of the rear brackets a distance which is slightly greater than the thickness of said seat, whereby one chair may be stacked on top of another chair with the downwardly facing [shoulder surfaces] *shoulders* of the rear brackets on the upper chair resting on the upwardly facing [shoulder surfaces] *shoulders* of the front brackets on the lower chair and the rear legs of the upper chair straddling the seat of and resting against said [bumpers] *spacers* on the rear legs of the lower chair so as to support the upper chair on the lower chair with the seat of the upper chair spaced from and inclined upwardly at a slight angle to the seat of the lower chair.

6. The subject matter of claim 5 including side arms on the chair located beyond the sides of the rear legs, respectively, and a removable desk on the chair including a flat top member, a right angularly extending shaft at the rear of said member rotatably and removably received in a horizontal bore extending through said rear stacking brackets to support said member for vertical swinging movement on the chair, and a downwardly opening channel member mounted on the underside of said member and removably fitting over one arm of the chair.

7. The subject matter of claim 1 including side arms on said first-mentioned chair located beyond the sides of the rear legs, respectively, and a removable desk on the chair including a right angularly extending shaft at the rear of said desk rotatably and removably received in a horizontal bore extending through said rear stacking brackets to support said desk for vertical swinging movement on the chair, and a downwardly opening channel member mounted on the underside of said desk for fitting over one of said arms.

*8. A stack chair comprising a rigid chair structure including a seat, a back rest, front legs depending below said seat, and rear upright members depending below said seat to form rear legs and extending above said seat to form said back rest, the spacing between said rear legs being greater than the width of said seat directly in front of said members, a pair of upper, upwardly presented stacking shoulders on said members, respectively, located approximately at the same elevation along said members, a pair of lower, downwardly presented stacking shoulders below and to the rear of said upper shoulders, said lower stacking shoulders being located approximately at the same elevation along said members, the vertical spacing between said upper and lower stacking shoulders being greater than the thickness of said seat, said upper stacking shoulders being accessible from the front sides of said members for stacking engagement from above, said lower stacking shoulders being accessible from the rear sides of said members for stacking engagement from below, said members having rearwardly presented surfaces directly below said lower stacking shoulders, said lower stacking shoulders extending rearwardly from said latter surfaces and downwardly toward the lower ends of said members to define with said latter surfaces downwardly opening recesses, said upper stacking shoulders generally complementing said recesses, and spacers on said members below said lower stacking shoulders and projecting beyond one of said sides of said members, whereby said chair is adapted to be stacked with other like chairs one on top of the other to form a chair stack wherein the rear legs of each chair straddle the seat of the adjacent lower chair directly in front of the rear legs of the latter chair, the lower stacking shoulders on each chair rest on the upper stacking shoulders of the adjacent lower chair with the upper stacking shoulders on each chair engaging in said recesses of the adjacent upper chair to interlock the adjacent chairs against relative fore and aft movement, and the spacers on the rear legs of each chair engage the rear legs of an adjacent chair, thereby to locate each chair in a stacked position relative to the adjacent lower chair wherein the seat of each chair is vertically spaced from and inclines upwardly at a slight angle with respect to the seat of the adjacent lower chair toward the front edges of the seats.*

*9. In combination: a plurality of substantially identical stack chairs, each chair comprising a rigid chair structure including a seat, a back rest, front legs depending below said seat, and rear upright members depending below said seat to form rear legs and extending above said seat to form said back rest, the spacing between said rear legs being greater than the width of said seat directly in front of said members, a pair of upper, upwardly presented stacking shoulders on said members, respectively, located approximately at the same elevation along said members, a pair of lower downwardly presented stacking shoulders below and to the rear of said upper shoulders, said lower stacking shoulders being located approximately at the same elevation along said members, the vertical spacing between said upper and lower stacking shoulders being greater than the thickness of said seat, said upper stacking shoulders being accessible from the front sides of said members for stacking engagement from above, said lower stacking shoulders being accessible from the rear sides of said members for stacking engagement from below, said members having rearwardly presented surfaces directly below said lower stacking shoulders, said lower stacking shoulders extending rearwardly from said latter surfaces and downwardly toward the lower ends of said members to define with said latter surfaces downwardly opening recesses, said upper stacking shoulders generally complementing said recesses, and spacers on said members below said lower stacking shoulders and projecting beyond one of said sides of said members, said chairs being stacked one on top of the other to form a chair stack wherein the rear legs of each chair straddle the seat of the adjacent lower chair directly in front of the rear legs of the latter chair, the lower stacking shoulders on each chair rest on the upper stacking shoulders of the adjacent lower chair with the upper stacking shoulders on each chair engaging in said recesses of the adjacent upper chair to interlock the adjacent chairs against relative fore and aft movement, and the spacers on the rear legs of each chair engage the rear legs of an adjacent chair, thereby to locate each chair in a stacked position relative to the adjacent lower chair wherein the seat of each chair is vertically spaced from and inclines upwardly at a slight angle with respect to the seat of the adjacent lower chair toward the front edges of the seats.*

References Cited by the Examiner

The following references, cited by the Examiner, are of record in the patented file of this patent or the original patent.

UNITED STATES PATENTS

| | | | |
|---|---|---|---|
| 635,423 | 10/1899 | Chase | 220—97 |
| 918,209 | 4/1909 | Sicotte | 312—111 X |
| 1,043,927 | 11/1912 | Harris | 297—154 |
| 1,250,110 | 12/1917 | Vanderveld | 312—111 |
| 1,989,426 | 1/1935 | Pollak | 297—239 |
| 2,184,470 | 12/1939 | Primavera | 297—239 |
| 2,805,901 | 9/1957 | Humphrey | 182—178 |
| 2,997,339 | 8/1961 | Wilson | 297—239 |
| 3,024,065 | 3/1962 | Eves et al. | 297—239 |

FOREIGN PATENTS

| | | |
|---|---|---|
| 624,642 | 4/1927 | France. |
| 917,640 | 9/1946 | France. |
| 55,885 | 4/1891 | Germany. |
| 912,393 | 5/1954 | Germany. |
| 210,172 | 5/1909 | Germany. |
| 592,227 | 2/1934 | Germany. |
| 828,246 | 2/1960 | Great Britain. |
| 308,858 | 10/1955 | Switzerland. |

FRANK B. SHERRY, *Primary Examiner.*

F. K. ZUGEL, *Assistant Examiner.*